(12) United States Patent
Cao et al.

(10) Patent No.: US 8,954,937 B2
(45) Date of Patent: Feb. 10, 2015

(54) SYSTEM AND METHOD FOR CREATING IMAGE DETECTION PROGRAM

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ming-Shan Cao, Guangdong (CN); Kuei-Yang Lin, New Taipei (TW); Wei Xu, Guangdong (CN); Yuan-Ke Li, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 31 days.

(21) Appl. No.: 13/689,797

(22) Filed: Nov. 30, 2012

(65) Prior Publication Data

US 2013/0254753 A1    Sep. 26, 2013

(30) Foreign Application Priority Data

Mar. 23, 2012  (CN) .......................... 2012 1 0078661

(51) Int. Cl.

| | | |
|---|---|---|
| *G01C 21/02* | (2006.01) | |
| *G01V 3/38* | (2006.01) | |
| *G10L 19/00* | (2013.01) | |
| *G10L 21/00* | (2013.01) | |
| *G06F 9/44* | (2006.01) | |
| *G06F 9/45* | (2006.01) | |
| *G06T 7/00* | (2006.01) | |

(52) U.S. Cl.
CPC ................ *G06F 8/41* (2013.01); *G06T 7/0004* (2013.01); *G06T 2207/20081* (2013.01)

USPC ............... 717/140; 701/469; 701/500; 702/5; 702/83; 702/152; 702/168; 702/176; 704/500; 717/122; 717/127

(58) Field of Classification Search
CPC ............... G06F 8/34; G06F 8/67; G06F 8/71; G06F 11/0748; G06F 11/0793; G06F 11/2294
See application file for complete search history.

(56) References Cited

U.S. PATENT DOCUMENTS

| | | | | |
|---|---|---|---|---|
| 5,198,990 | A * | 3/1993 | Farzan et al. | 702/168 |
| 5,465,221 | A * | 11/1995 | Merat et al. | 702/83 |
| 5,970,431 | A * | 10/1999 | He | 702/152 |
| 6,012,022 | A * | 1/2000 | Michiwaki | 702/168 |
| 6,308,108 | B1 * | 10/2001 | Michiwaki et al. | 702/176 |
| 7,623,248 | B2 * | 11/2009 | Laflamme | 701/469 |
| 8,156,213 | B1 * | 4/2012 | Deng et al. | 717/122 |
| 8,306,747 | B1 * | 11/2012 | Gagarin et al. | 701/500 |
| 8,806,278 | B2 * | 8/2014 | Hess | 717/127 |
| 2010/0091017 | A1 * | 4/2010 | Kmiecik et al. | 702/5 |
| 2011/0292173 | A1 * | 12/2011 | Tsukagoshi | 704/500 |

* cited by examiner

*Primary Examiner* — Don Wong
*Assistant Examiner* — Anibal Rivera
(74) *Attorney, Agent, or Firm* — Novak Druce Connolly Bove + Quigg LLP

(57) ABSTRACT

An image detection program creating system comprise a parameter setting module, an image loading module, a programming module, and a program conversion module. The parameter setting module sets parameters of a Dimensional Measuring Interface Specification (DMIS). The image loading module loads a 3D image. The programming module programs the DMIS program according to the parameters of the DMIS and the 3D image. The program conversion module converts the compiled DMIS into an image detection program.

11 Claims, 2 Drawing Sheets

SYSTEM AND METHOD FOR CREATING IMAGE DETECTION PROGRAM

BACKGROUND

1. Technical Field

The present disclosure relates to a system and a method for creating an image detection program.

2. Description of Related Art

One method of detecting external dimensions of a product, such as an electronic product, is to detect a sample image by a charge-coupled device (CCD) image detector. The CCD image detector compiles a digital signal of the sample image to transform the sample image into a standard detection program. Then, the CCD image detector can detect the external dimension of future products. But, the method must obtain a sample object before the program can be programmed If the period of researching the sample object is a long time, then an efficiency of creating the image detection program will be affected.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 1:
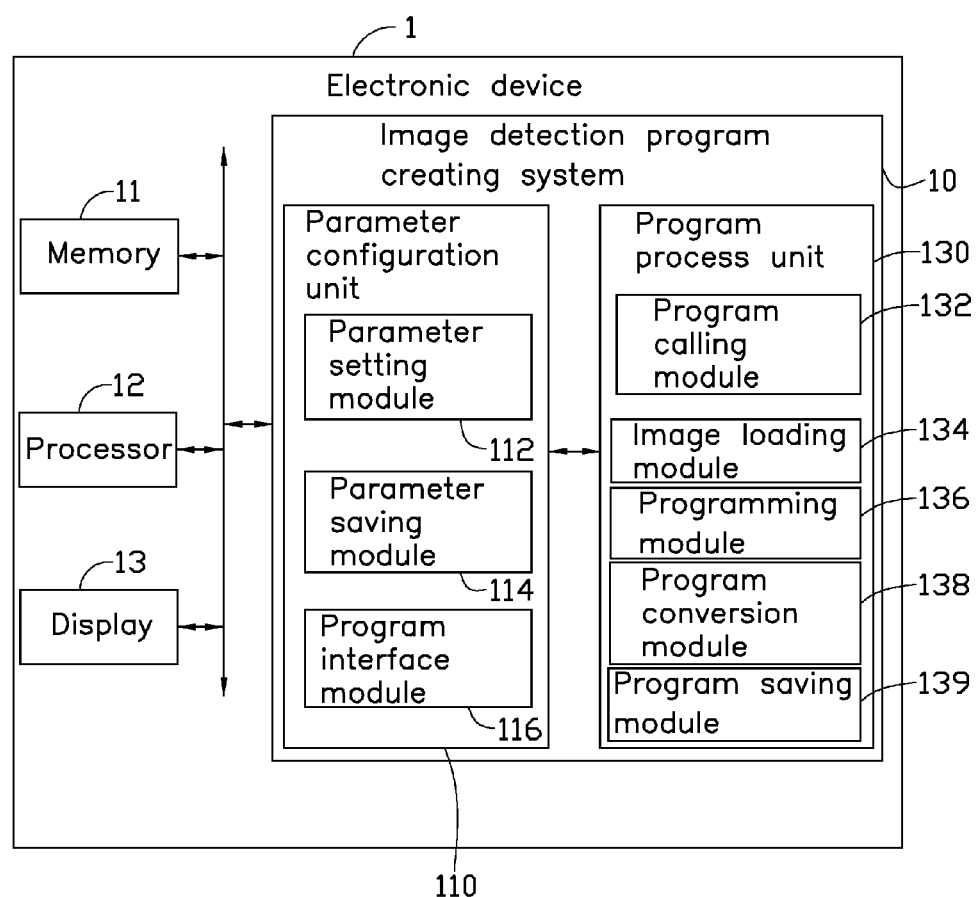
FIG. 1 is a block diagram of one embodiment of an electronic device comprising an image detection program creating system.

FIG. 1 is a block diagram of one embodiment of an electronic device 1 comprising an image detection program creating system 10. The image detection program creating system 10 detects dimensions of a product (such as a product being tested) according to a standard image detection program of a standard image of the product. The electronic device 1 may be an electronic product, a personal computer or a server for example. The electronic device 1 comprises memory 11, a processor 12, and a display 13. The product may be a portable electronic device or a cell phone, for example.

The image detection program creating system 10 comprises a parameter configuration unit 110 and a program process unit 130. In the embodiment, the image detection program creating system 10 comprises one or more modules comprising computerized code that can be saved in the memory 11, where the processor 12 executes the computerized code. Results are displayed by the display 13.

The parameter configuration unit 110 comprises a parameter setting module 112, a parameter saving module 114, and a program interface module 116.

The parameter setting module 112 sets parameters of Dimensional Measuring Interface Specification (DMIS). In the embodiment, the parameter setting module 112 sets a focusing parameter and an edge finding parameter. The focusing parameter is assigned to a coordinate area. The edge finding parameter is assigned to the direction of movement of pixel points in the coordinate area. With the parameters, the DMIS can be created without a sample product.

The parameter saving module 114 saves the parameters of the DMIS set by the parameter setting module 112. The program interface module 116 is an interface displayed on the display 13 that offers user selections of the parameters of the DMIS to the program process unit 130.

The program process unit 130 creates a new image detection program for the product. The program process unit 130 comprises a program calling module 132, an image loading module 134, a programming module 136, a program conversion module 138, and a program saving module 139.

The program calling module 132 determines whether the product has a corresponding DMIS. In response to no DMIS corresponds to the product, the program calling module 132 prompts the user to create a new DMIS. In response to determining that first a DMIS corresponds to the product, the program calling module 132 calls the first DMIS.

The image loading module 134 loads a 3D image of the product. The 3D image is a format of a CAD file, a .stp file or an .igs file for example.

The programming module 136 defines the value range of the pixel points in the 3D image by the focusing parameter and defines the direction of movement of the coordinates of the pixel points by the edge finding parameter. In response to no DMIS corresponds to the product, the programming module 136 creates a new DMIS for the product according to the 3D images loaded from the image loading module 134 and the parameters of the DMIS set by the parameter setting module 112, and then the programming module 136 compiles the DMIS. In response to determining that first a DMIS corresponds to the product, the program calling module 132 calls the DMIS and then the programming module 136 compiles the DMIS.

The program conversion module 138 converts the DMIS compiled by the programming module 136 into the image detection program. The image detection program is saved as a format of .txt file. The program saving module 139 saves the image detection program. An image detection device can directly call the image detection program to detect the product.

Figure 2:
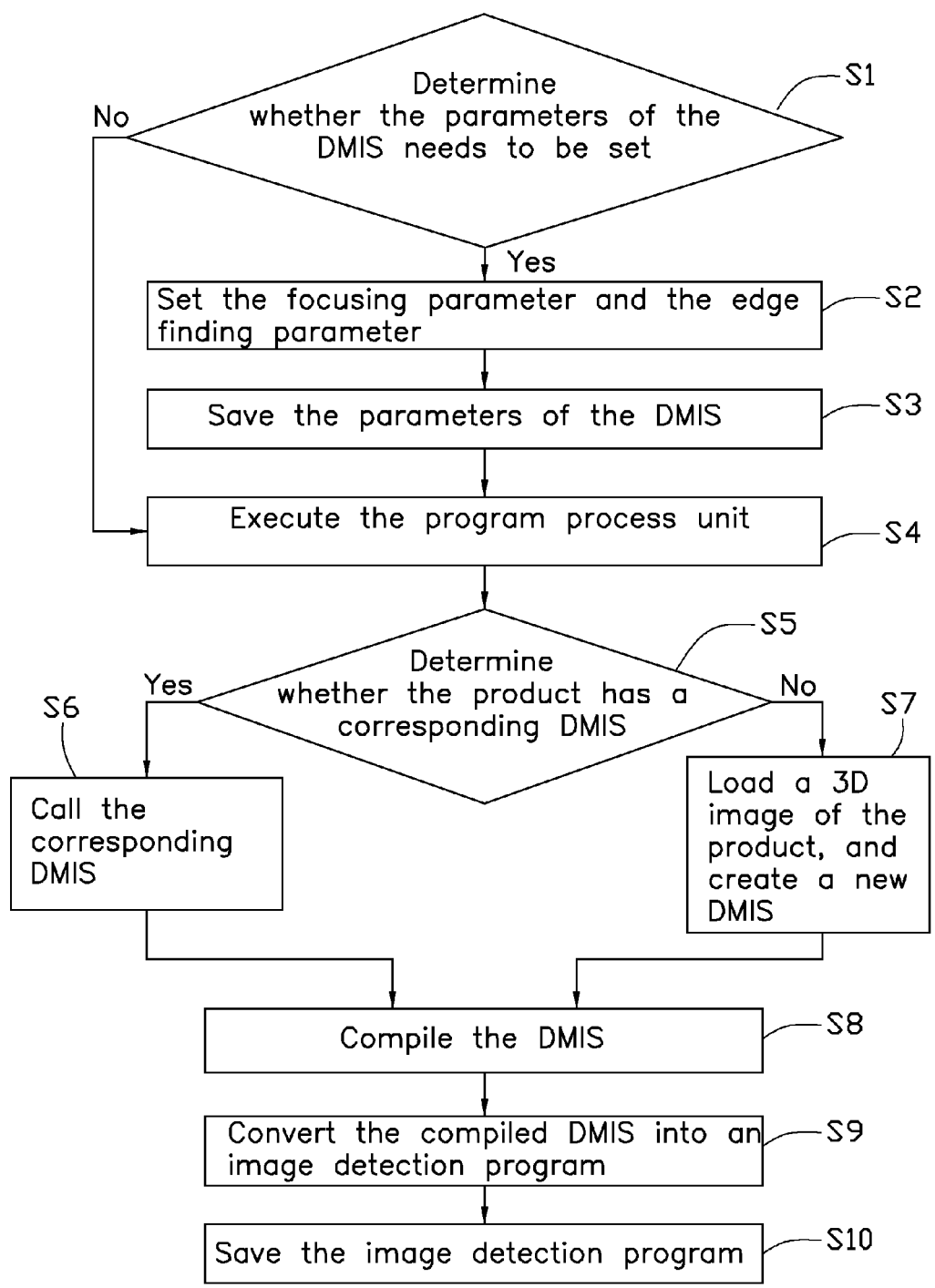
FIG. 2 is a flowchart illustrating one embodiment of a method for creating an image detection program.

The following process is combined with FIG. 2 to explain a workflow of the image detection program creating system 10. The image detection program creating method comprises the following steps:

In step S1, determining whether the parameters of the DMIS needs to be set. If the parameter configuration unit 110 is never used, then the parameters of the DMIS need to be set, and then step S2 is implemented. If the parameter configuration unit 110 has saved the parameters of the DMIS, then the parameters of the DMIS do not need to be set again, and then step S4 is implemented.

In step S2, the parameter setting module 112 sets the focusing parameter and the edge finding parameter and then step S3 is implemented.

In step S3, the parameter saving module 114 saves the parameters of the DMIS set by the parameter setting module 112 and then step S4 is implemented.

In step S4, the program process unit 130 is executed and then the step S5 is implemented.

In step S5, the program calling module 132 determines whether the product has a corresponding DMIS. In response to determining that first a DMIS corresponds to the product, step S6 is implemented. In response to no DMIS corresponds to the product, the program calling module 132 prompts a user to create a new DMIS and step S7 is implemented.

In step S6, the program calling module 132 calls the first DMIS and then step S8 is implemented.

In step S7, the image loading module 134 loads a 3D image of the product, and the programming module 136 create a new DMIS according to the parameters of the DMIS and the 3D image, and then step S8 is implemented.

In step S8, the programming module 136 compiles the DMIS and then step S9 is implemented.

In step S9, the program conversion module 138 converts the compiled DMIS into an image detection program and then step S10 is implemented.

In step S10, the program saving module 139 saves the image detection program for future direct calling.

Depending on the embodiment, certain of the steps described may be removed, other may be added, and the sequence of the steps may be altered. It is also to be understood that the description and the claims drawn to a method may include some indication in reference to certain steps. However, the indication used is only to be viewed for identification purposes and not necessarily as a suggestion as to an order for the steps.

The image detection program creating system 10 of the present disclosure loads the 3D image of the product and compiles the DMIS according to the 3D image of the product. The image detection program creating system 10 converts the compiled DMIS into the image detection program. Then the image detection device can call the image detection program to analyze the product. A tester can preprogram the product in development by using the 3D image of the product without the sample of the product. Using the image detection program creating system 10 raises an efficiency of the task.

The present disclosure conforms to the patentability of inventions, and submits the application in conformity with patent law. The above disclosure is the preferred embodiment. Anyone of ordinary skill in this field can modify and change the embodiment in the spirit of the present disclosure, and all such changes or modifications are included in the scope of the following claims.

What is claimed is:

1. A computer-implemented method of creating an image detection program, the method comprising:
    setting parameters of a Dimensional Measuring Interface Specification (DMIS);
    loading a 3D image;
    compiling the DMIS according to the parameters of the DMIS and the 3D image;
    converting the compiled DMIS into an image detection program;
    setting a focusing parameter and an edge finding parameter; and
    creating a new DMIS without a sample of the product.

2. The method of claim 1, wherein the method further comprises:
    in response to determining that first a DMIS corresponds to a product, calling the first DMIS, and in response to no DMIS corresponds to the product, prompting a user to establish the new DMIS and loading the 3D image.

3. The method of claim 1, wherein the method further comprises: saving the image detection program after converting the compiled DMIS.

4. A system for creating an image detection program, comprising:
    memory;
    at least one processor; and
    one or more modules stored in the storage device and executed by the at least one processor, the one or more modules comprising:
        a parameter configuration unit including a parameter setting module;
        a program process unit including an image loading module, a programming module, and a program conversion module;
        wherein the parameter setting module sets parameters of a Dimensional Measuring Interface Specification (DMIS);
        wherein the image loading module loads a 3D image;
        wherein the programming module programs the DMIS according to
    the parameters of the DMIS and the 3D image;
        wherein the program conversion module converts the compiled DMIS
    into an image detection program; and
        wherein the parameter setting module sets a focusing parameter and
    an edge finding parameter, and creates a new DMIS without a sample of the product.

5. The system of claim 4, wherein the program process unit includes a program calling module, and in response to determining that first a DMIS corresponds to a product, the program calling module calls the DMIS, and in response to no DMIS corresponds to the product, the program calling module prompts a user to establish the new DMIS.

6. The system of claim 4, wherein the parameter configuration unit includes a parameter saving module saving the parameter of the DMIS.

7. The system of claim 4, wherein the parameter configuration unit further includes a program interface module which is an interface that offers user selections of the parameters of the DMIS to the program process unit.

8. The method of claim 4, wherein the program process unit further includes the program saving module for saving the image detection program.

9. A non-transitory computer-readable storage medium having stored thereon instructions that, when executed by at least one processor of a computing device, cause the computing device to perform a method of creating an image detection program, the method comprising:
    setting parameters of a Dimensional Measuring Interface Specification (DMIS);
    loading a 3D image;
    compiling the DMIS according to the parameters of the DMIS and the 3D image;
    converting the compiled DMIS into an image detection program;
    setting a focusing parameter and an edge finding parameter; and
    creating a new DMIS without a sample of the product.

10. The storage medium of claim 9, wherein the method further comprises: in response to determining that first a DMIS corresponds to a product, calling the first DMIS, and in response to no DMIS corresponds to the product, prompting a user to establish the new DMIS and loading the 3D image.

11. The storage medium of claim 9, wherein the method further comprises:
   saving the image detection program after converting the compiled DMIS.

\* \* \* \* \*